United States Patent
Gutjahr et al.

(10) Patent No.: US 11,296,564 B2
(45) Date of Patent: Apr. 5, 2022

(54) ROTOR OF AN ELECTRIC MACHINE

(71) Applicant: Baumueller Nuernberg GmbH, Nuremberg (DE)

(72) Inventors: Frank Gutjahr, Etzelwang (DE); Paul Eisfeld, Nuremberg (DE)

(73) Assignee: Baumueller Nuernberg GmbH, Nuremberg (DE)

( * ) Notice: Subject to any disclaimer, the term of this patent is extended or adjusted under 35 U.S.C. 154(b) by 102 days.

(21) Appl. No.: 16/847,299

(22) Filed: Apr. 13, 2020

(65) Prior Publication Data
US 2020/0244120 A1 Jul. 30, 2020

Related U.S. Application Data

(63) Continuation of application No. PCT/EP2018/072446, filed on Aug. 20, 2018.

(30) Foreign Application Priority Data

Oct. 11, 2017 (DE) .................. 10 2017 218 153.2

(51) Int. Cl.
*H02K 1/27* (2022.01)
*H02K 1/28* (2006.01)
(Continued)

(52) U.S. Cl.
CPC ............... *H02K 1/278* (2013.01); *H02K 1/04* (2013.01); *H02K 1/28* (2013.01); *H02K 21/14* (2013.01); *H02K 29/03* (2013.01)

(58) Field of Classification Search
CPC ............ H02K 1/278; H02K 1/04; H02K 1/28; H02K 21/14; H02K 29/03
See application file for complete search history.

(56) References Cited

U.S. PATENT DOCUMENTS

| 6,614,142 B1* | 9/2003 | Bonnieman | H02K 1/24 310/216.004 |
| 7,709,991 B2* | 5/2010 | Ionel | H02K 1/22 310/216.001 |

(Continued)

FOREIGN PATENT DOCUMENTS

| CN | 202231516 U | 5/2012 |
| CN | 203574463 U | 4/2014 |

(Continued)

OTHER PUBLICATIONS

"Eyelet, n." OED Online. Oxford University Press, Sep. 2021. Web. Sep. 21, 2021. (Year: 2021).*

*Primary Examiner* — Thomas Truong
(74) *Attorney, Agent, or Firm* — Muncy, Geissler, Olds & Lowe, P.C.

(57) ABSTRACT

A rotor of an electric machine, in particular an electric motor, having a rotor body, which circumferentially surrounds a shaft and includes a first sub-body and a second sub-body. The first sub-body and the second sub-body are joined together in the axial direction by means of an axle which extends in the axial direction and is offset radially to the outside with respect to the shaft. The first sub-body includes an eyelet, within which a socket receiving the axle is arranged, and the second sub-body includes a lug, which receives the axle. An electric machine, in particular an electric motor, is also provided.

14 Claims, 10 Drawing Sheets

(51) Int. Cl.
     *H02K 1/278*     (2022.01)
     *H02K 1/04*     (2006.01)
     *H02K 21/14*     (2006.01)
     H02K 29/03     (2006.01)

(56) References Cited

U.S. PATENT DOCUMENTS

| | | |
|---|---|---|
| 9,601,954 B2 | 3/2017 | Lange |
| 2010/0244619 A1* | 9/2010 | Dolle .................. H02K 1/12 |
| | | 310/216.129 |
| 2011/0074242 A1* | 3/2011 | Singhal .................. H02K 7/16 |
| | | 310/216.058 |
| 2016/0141928 A1 | 3/2016 | Lai et al. |
| 2018/0183285 A1* | 6/2018 | Asano .................. H02K 1/2766 |

FOREIGN PATENT DOCUMENTS

| | | |
|---|---|---|
| DE | 10 2012 215 241 A1 | 3/2014 |
| DE | 10 2014 117 025 A1 | 5/2016 |
| GB | 2468718 A | 9/2010 |
| JP | 2010-17032 A | 1/2010 |
| WO | WO 2012/086614 A1 | 6/2012 |

* cited by examiner

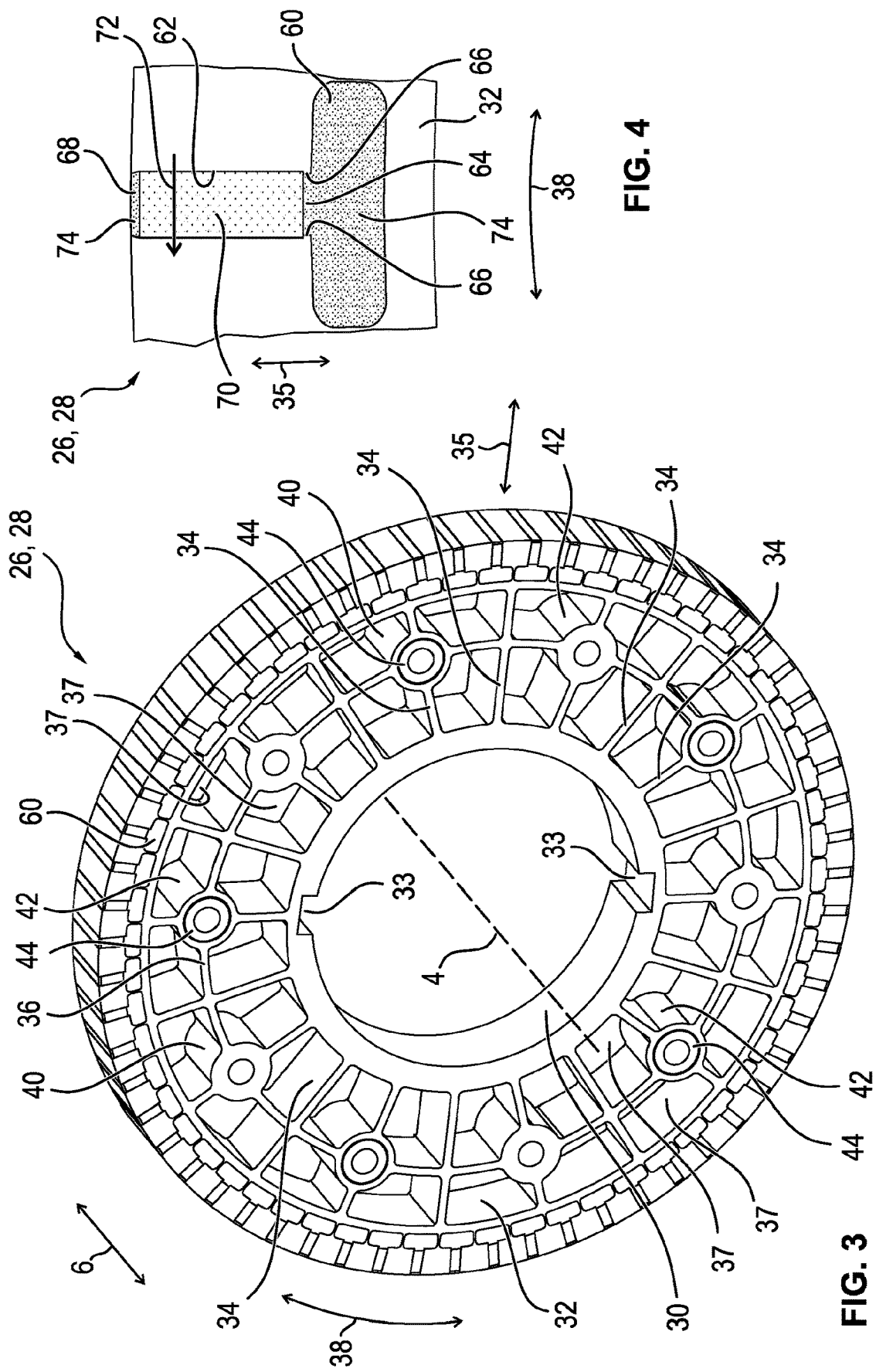

ROTOR OF AN ELECTRIC MACHINE

This nonprovisional application is a continuation of International Application No. PCT/EP2018/072446, which was filed on Aug. 20, 2018, and which claims priority to German Patent Application No. 10 2017 218 153.2, which was filed in Germany on Oct. 11, 2017, and which are both herein incorporated by reference.

BACKGROUND OF THE INVENTION

Field of the Invention

The present invention relates to a rotor of an electric machine, comprising a rotor body, which circumferentially surrounds a shaft and which includes a first sub-body and a second sub-body, which are joined together in the axial direction. The invention also relates to an electric machine. The electric machine is, in particular, an electric motor.

Description of the Background Art

Industrial equipment usually has actuators that are driven by means of an electric motor. In plastic processing and plastic manufacturing, for example, possible screw conveyors or pressing stamps are usually driven by means of an electric motor. A provision and laying of pneumatic or hydraulic lines is thus not necessary, which reduces maintenance and therefore complexity. For example, a stamp or a screw of a plastic injection molding device is driven by means of the electric motor. Another use of electric motors is found, for example, in the maritime sector, the electric motor being mounted, for example, in a nacelle on the hull of a ship. Due to the comparatively compact design of the electric motor, it is possible to pivot the nacelle with respect to the hull, which increases the maneuverability of the ship.

In the aforementioned applications for the electric motor, it is necessary to provide a comparatively high torque with the aid thereof. Due to a usually constricted installation position, space for a transmission is usually not available or is at least limited. Consequently, the torque cannot, or cannot completely, be provided by reducing a comparatively high torque of the electric motor. The electric motor usually has a brushless design, which reduces wear. The electric motor is customarily energized by means of a converter, which has, in particular, a bridge circuit, such as a B6 circuit. A field current may be injected into the brushless electric motor, which results in a formation of a reluctance torque.

In order for a reluctance torque to form, it is necessary for a rotor of the electric motor to have different torques in different directions. This is implemented by arranging permanent magnets in pockets of a laminated core of the rotor. Due to an arrangement of this type, however, magnetic short-circuits result within the laminated core, which, in turn, leads to a reduction of the torque.

The laminated core usually includes a number of individual laminations, which are stacked one above the other in the axial direction and are fastened to each other. If a comparatively high torque is to be transmitted by means of the electric motor, threaded rods are ordinarily used for this purpose, which extend through the entire laminated core, and on the ends of which nuts are placed. The individual laminations are pressed against each other by tightening the nuts. To enable the threaded rod to be mounted, it is necessary for the individual laminations to each have a recess which are in alignment with each other, the channel created in this manner having at least the diameter of the threaded rod. If comparatively large manufacturing tolerances are selected, which results in lower manufacturing costs, it is possible to position the individual laminations at a comparatively great distance from the threaded rod. As a result, the position of these laminations is not precisely stabilized, which makes it difficult to introduce permanent magnets into the pockets. The magnets may also be destroyed during the introduction of the threaded rod. It is furthermore possible that the laminations rotate toward each other in the tangential direction despite the threaded rods, which may result in an undesirable noise development or imbalance. A damage to one of the permanent magnets, for example, is also possible.

SUMMARY OF THE INVENTION

It is therefore an object of the invention to provide a particularly suitable rotor of an electric machine as well as a particularly suitable electric machine, an assembly being advantageously made easier.

The rotor is part of an electric machine. The electric machine is, for example, a brush-type machine. However, the electric machine particularly preferably has a brushless design. For example, the electric machine is a generator. However, the electric machine is particularly preferably an electric motor, in particular a brushless electric motor. The electric motor is, in particular, a synchronous machine, such as a synchronous motor. During operation, the electric machine is preferably electrically connected to a converter and is operated thereby or comprises the converter. The electric machine has, for example, a power output between 30 kW and 150 kW, between 40 kW and 140 kW or between 60 kW and 100 kW and, in particular, equal to 80 kW, a deviation, for example, of 10 kW, 5 kW, 2 kW or 0 kW being present in each case. The electric machine suitably has a rotational speed, for example a nominal rotational speed or maximum rotational speed, between 200 rpm and 8,000 rpm, between 300 rpm and 6,000 rpm, between 500 rpm and 5,000 rpm or between 1,000 rpm and 4,000 rpm, in particular a deviation of 100 rpm, 50 rpm, 20 rpm or 0 rpm being present. The electric machine particularly preferably has a torque, for example a maximum and/or nominal torque, between 100 Nm and 20,000 Nm, between 165 Nm and 17,500 Nm, between 200 Nm and 15,000 Nm, between 500 Nm and 10,000 Nm or between 5,000 Nm and 8,000 Nm, in particular a deviation of 50 Nm, 20 Nm, 10 Nm or 0 Nm being present in each case. The electric machine is, in particular, an internal-rotor motor. The electric motor is preferably a torque motor having integrated electronics, and a converter is, in particular, mounted, advantageously on a B-side end shield. A torque motor is understood to be, in particular, a multipole electric direct drive from the group of low-speed machines. The torque motor advantageously has more than 20, 40 or 60 poles.

The electric machine is, for example, part of a servo press. In other words, a press, in particular, is driven by means of the electric machine. Alternatively hereto, the electric machine is part of a ship propulsion unit, which is provided and configured to be mounted within a nacelle on a hull of a ship. Alternatively hereto, the electric machine is preferably used for plastic processing and/or plastic manufacturing. For example, an extruder or another part of a plastic injection molding machine, such as a stamp, is driven by means of the electric machine.

The rotor includes a rotor body, which circumferentially surrounds a shaft. The shaft extends in an axial direction along a rotation axis and has, for example, a cylindrical, in particular hollow cylindrical, design, the particular cylinder axis being in parallel to the axial direction. In particular, the rotor is provided and configured to be rotatably mounted around the rotation axis in the assembled state. The shaft is suitably made from a steel, such as a high-grade steel or another steel. The rotor body suitably circumferentially abuts the shaft, for example directly. The rotor body is preferably fastened to the shaft and is suitably rotatably fixedly connected thereto. The shaft preferably projects over the rotor body in the axial direction.

The rotor body itself includes a first sub-body and a second sub-body, which are joined together in the axial direction. For example, the first sub-body and the second sub-body are fastened to each other. The second sub-body is advantageously offset from the first sub-body in the axial direction, so that they do not overlap in the axial direction. For example, the two sub-bodies each abut each other on the end face, for example via another component or particularly preferably directly. The joining together takes place by means of an axle extending in the axial direction, which thus runs in parallel to the shaft. The axle is fixedly arranged and non-rotatable, in particular in the assembled state. The axle is offset radially to the outside with respect to the shaft and suitably runs within the rotor body. The axle is preferably offset radially to the inside with respect to a radial outer boundary of the rotor body, so that the axle runs through the rotor body.

The first sub-body has a eyelet, within which a socket receiving the axle is arranged. The socket has a hollow cylindrical design and circumferentially surrounds the axle, at least in sections. In other words, a section of the axle, in particular the section of the axle running through the first sub-body, is circumferentially surrounded by the socket. Once again, in other words, the axle is arranged within the socket. The socket is preferably hollow cylindrical. The socket suitably circumferentially abuts the axle, for example via another component or particularly preferably mechanically directly. A clearance fit is advantageously established between the socket and the axle. Alternatively hereto, a press fit is established between the socket and the axle.

The second sub-body includes a lug that receives the axle. The lug circumferentially surrounds the axle at least in sections, in particular the section of the axle running within and/or through the second sub-body. The axle is thus suitably arranged within the lug, and the lug advantageous abuts the axle on the circumferential side, for example via another component or particularly preferably directly. For example, a clearance or press fit is established between the axle and the lug.

As a result, on the one hand, this makes it possible to provide a tolerance compensation by means of the socket, a force application from the axle onto the first sub-body by means of the socket and back again is damped. On the other hand, an axial movement of the socket is essentially prevented by means of the lug. However, it is only necessary for the axle to be comparatively precisely inserted into the second sub-body. Due to the socket and the tolerance compensation provided in this manner, an introduction is facilitated, so that the assembly is simplified.

A clearance fit is particularly preferably established between the eyelet and the axle and/or between the lug and the axle. For example, the inner diameters of the socket and the lug are in alignment with each other. The axle is provided, in particular, with a cylindrical design. For example, the rotor body is rotatably fixedly connected to the shaft by means of an adjustment spring. In other words, the shaft or the rotor body, for example, has a spring which engages with a groove of the rotor body or the shaft. Both the shaft and the rotor body particularly preferably have a groove running in the axial direction, within which a shared adjustment spring is arranged to transmit a torque between the rotor body and the shaft.

The axle advantageously projects over the two sub-bodies, in particular over the rotor body, in the axial direction. Additional components are preferably mounted on the axle on the end side, by means of which a force is applied to the two sub-bodies in the axial direction, so that they are pressed together in the axial direction. The components are adjustable with respect to each other, for example in the axial direction, so that the force is provided by suitably positioning the components. The extension of the first sub-body in the axial direction is suitably the same as the extension of the second body in the axial direction, so that the two joined-together sub-bodies have twice the extension in the axial direction as the first sub-body or the second sub-body.

The rotor includes, for example, a number of magnets, in particular electromagnets. The rotor particularly preferably comprises a number of permanent magnets, which are, for example, circumferentially fastened to the rotor body. However, the magnets are particularly preferably arranged within pockets of the rotor body, which extend, in particular, in the axial direction. The pockets are advantageously oriented essentially radially, the permanent magnets being arranged, in particular, also radially. Each of the permanent magnets is suitably arranged in one of the pockets. For example, a clearance fit is established, at least in sections, between the particular pocket and the assigned (permanent) magnet. The first and/or the second sub-body is/are made, in particular, from a ferromagnetic material. The permanent magnets are preferably tangentially magnetized. In particular, the magnets are arranged in the first sub-body as well as in the particular second sub-body, advantageously within pockets. For example, each of the magnets of the rotor body extends through the two sub-bodies, or an individual magnet part is assigned to each sub-body, the individual magnet parts of the two sub-bodies being in alignment with each other.

The socket is particularly preferably pressed with the eyelet. A press fit is advantageously established between the socket and the eyelet. As a result, the socket is stabilized by means of the eyelet, and a removal of the socket from the eyelet during the insertion of the axle into the socket is prevented, which further facilitates an assembly. The transfer of force between the first sub-body and the axle is also improved in this way, and a vibration amplitude of the axle during operation is reduced. The socket is suitably manufactured from a plastic, in particular in a plastic injection molding process. Manufacturing costs are thus low. In addition, essentially no changes to the magnetic properties of the rotor occur, due to the socket. The plastic is, for example, a thermoplastic, in particular polytetrafluoroethylene (PTFE). An insertion of the axles is simplified, due to the comparatively low friction coefficients.

In particular, the eyelet is provided with an annular or hollow cylindrical design. The extension of the eyelet in the axial direction is suitably equal to the extension of the complete first sub-body in the axial direction. Alternatively or particularly preferably in combination therewith, the lug is provided with an annular or hollow cylindrical design, the length of the lug in the axial direction advantageously corresponding to the length of the second sub-body in the axial direction. The outer diameter of the eyelet is advantageously equal to the outer diameter of the lug. The outer diameters of the eyelet and the lug are suitably in alignment.

As a result, a flux of force is improved, and a plastic or elastic deformation of the eyelet or the lug is avoided upon the application of a force to press the two sub-bodies together, so that a comparatively secure joining together of the two sub-bodies is made possible, Due to the comparatively high possible contact force, a robustness of the rotor is also increased.

In particular, the first and/or the second sub-body is/are created by sintering a powder, such as a ferrite powder. For example, the first and/or the second sub-body is/are formed as a single piece or assembled by means of individual segments. However, the first sub-body is particularly preferably a laminated core or at least comprises the latter. Alternatively or particularly preferably in combination therewith, the second sub-body is a laminated core or at least comprises the latter. The individual laminations of each of the sub-bodies are suitably structurally identical and, for example, formed from a single piece. The laminations of each laminated core are stacked one on top of the other in the axial direction, an outer boundary and/or possible pockets being advantageously in alignment with each other. For example, each layer is created by means of individual lamination segments. However, each layer of the laminated core is particularly preferably formed from a single piece, so that each laminated core has the same number of laminations as layers, and for which reason all laminations are stacked one on top of the other in the axial direction. For example, the thickness of the lamination layers, in particular the individual laminations, is between 1 mm and 0.1 mm, between 0.8 mm and 0.2 mm and, for example, essentially equal to 0.5 mm in the axial direction.

In particular, the laminations are made from an iron, for example transformer sheet metal. For example, the laminations are provided with an electrical insulation on the outside, in particular with a coating. For example, each of the sub-bodies has between 1,000 laminations and 2,000 laminations, between 1,200 laminations and 1,800 laminations and, in particular exactly 1,500 laminations, for example a deviation of 200 laminations, 100 laminations or 0 laminations being present. The individual laminations are advantageously baked to each other. For this purpose, the laminations are suitably provided with a coating, which is at least partially liquefied when heated. The individual laminations thus adhere to each other once they are stacked one on top of the other, heated, and cooled again, which simplifies an assembly.

For example, the first sub-body and the second sub-body each include an axially extending first hollow cylinder and an axially extending second hollow cylinder. In other words, both the first sub-body and the second sub-body have the two hollow cylinders. The second hollow cylinder circumferentially surrounds the first hollow cylinder and is suitably spaced a distance apart therefrom. The second hollow cylinder is advantageously arranged concentrically to the first hollow cylinder and/or to the shaft. The first hollow cylinder is preferably arranged concentrically to the shaft and, for example, abuts the latter, suitably directly. In particular, the first hollow cylinder has a groove for receiving an adjusting spring for transmitting the torque between the shaft and the rotor body in each case. For example, the possible (permanent) magnets abut the second hollow cylinder, and/or radially outwardly oriented projections are arranged on the second hollow cylinder, by means of which the possible magnets are held and/or stabilized.

The two hollow cylinders of each sub-body are connected to each other by means of radially running spokes, which are suitably fastened to the first hollow cylinder and/or the second hollow cylinder. In particular, the spokes are molded on the first hollow cylinder and the second hollow cylinder. The spokes extend in the axial direction and suitably have the same axial extension as the first and second hollow cylinders of the particular sub-body. In particular, openings are formed between the first hollow cylinder and the second hollow cylinder, which are filled, for example, with air. As a result thereof, a weight of the rotor is reduced, for which reason an inertia is reduced and thus dynamics of the electric machine is increased.

For example, each of the sub-bodies includes between 4 spokes and 100 spokes, between 10 spokes and 80 spokes, between 20 spokes and 50 spokes. The spokes of the first sub-body are particularly preferably in alignment with the spokes of the second sub-body. Alternatively or particularly preferably in combination therewith, the first hollow cylinder of the first sub-body is in alignment with the first hollow cylinder of the second sub-body, and/or the second hollow cylinder of the first sub-body is in alignment with the second hollow cylinder of the second sub-body. The spokes, the first hollow cylinder and the second hollow cylinder of the two hollow bodies are particularly preferably in alignment with each other. As a result, a transmission of force onto the two sub-bodies with the axle in the axial direction is improved, and no deformation of the two sub-bodies essentially occurs.

The axle is arranged, in particular, between the first hollow cylinder and the second hollow cylinder and preferably placed at a distance from the two hollow cylinders. The eyelet and/or the lug is/are preferably connected to at least one of the particular spokes, which further simplifies a construction. Due to such an arrangement of the axle, it is possible to position the possibly present magnets essentially independently of the axle. A corruption of a magnetic field due to the axle is also essentially prevented. It is also possible to control a correct installation of the axle due to the openings formed between the two hollow cylinders.

The rotor particularly preferably comprises a third hollow cylinder, which extends axially and is, in particular, concentric to the first hollow cylinder and/or the second hollow cylinder. The third hollow cylinder is arranged between the first and second hollow cylinders and is, in particular, placed at a distance therefrom. The spokes intersect the third hollow cylinder. Due to the third hollow cylinder, it is possible to select a comparatively great distance between the first hollow cylinder and the second hollow cylinder, a stabilization by means of the third hollow cylinder taking place. In particular, the third hollow cylinder at least partially intersects the eyelet or lug. The third cylinder suitably includes the eyelet or lug. In addition, at least one of the spokes preferably includes the eyelet or lug. For example, the spokes run both radially and tangentially, in particular only in a tangential direction or in both tangential directions, i.e. clockwise and counterclockwise. Adjacent spokes in each case are preferably connected to each other on the end side, which increases a stability. Alternatively or in combination herewith, for example spokes intersect each other between their free ends, which further increases the stability.

The rotor suitably comprises a second axle, and the second sub-body includes a eyelet, within which a socket is arranged. Both the first sub-body and the second sub-body thus each include the eyelet, the assigned socket being arranged in the particular eyelet. The socket, in turn, is provided with a hollow cylindrical design, and the eyelet surrounds the socket, in particular on the circumferential side. The first sub-body additionally includes a lug. In the assembled state, the socket of the first sub-body receives the second axle, and the lug of the first sub-body receives the second axle. The second axle is oriented in parallel to the axle and/or to the shaft and has, for example, the same design as the axle. The second axle preferably extends through the second sub-body and the first sub-body and is, in particular, offset radially to the outside with respect to the shaft. For example, the second axle is arranged point-symmetrically with respect to the rotation axis of the shaft relative to the axle. In other words, the second axle is offset by 180° with respect to the rotation axis of the axle and is therefore oppositely arranged. Due to the second axle, a stability of the rotor is increased, the position of the first sub-body being comparatively precisely defined by means of the lug. A tolerance compensation takes place by means of the socket assigned to the first sub-body. In the case of the second sub-body, the tolerance compensation takes place by means of the second axle and the socket, while the comparatively precise positioning takes place by means of the lug of the second sub-body and the axle. In particular, the sockets are structurally identical, which results in reduced manufacturing costs. The socket preferably circumferentially abuts a section of the second axle, in particular mechanically directly. The lug of the first sub-body particularly preferably abuts the second axle mechanically directly and circumferentially surrounds the latter at least in sections.

The two sub-bodies are particularly preferably structurally identical. As a result, a comparatively large number of equivalent parts may be used, which reduces manufacturing costs. For example, the first sub-body is rotated by a certain angle with respect to the second sub-body, for example 180° around the rotation axis, so that the eyelet and socket of the second sub-body are assigned to the lug of the first sub-body, and the eyelet and socket of the first sub-body are assigned to the lug of the second sub-body. The central recesses thereof are in alignment, in particular in each case, which makes it easier to insert the first and second axles.

The first sub-body suitably has a first number of eyelets of this type, within each of which a socket is arranged. In particular, one of the sockets is assigned to each eyelet, which are advantageously structurally identical and/or are preferably provided with a hollow cylindrical design, and whose axes are, in particular, in parallel to a rotation axis of the shaft. The second sub-body has the first number of lugs of this type. In other words, the first sub-body has the same number of eyelets as the second sub-body has lugs. The rotor also has the first number of axles, which are offset radially to the outside with respect to the shaft and are arranged in parallel to the rotation axis, i.e. in parallel to the axial direction. In particular, the distance of the axles from the rotation axis of the shaft is constant. The first sub-body and the second sub-body are joined together by means of the axles, in particular a contact pressure of the two sub-bodies against each other is to be established by means of the axles. In each case, one of the axles is assigned to one of the eyelets and one of the lugs for this purpose, so that each socket and each lug receives one of the axles. Due to the first number of axles, the robustness of the rotor is increased, and a comparatively high contact pressure may be built up.

The axles are suitably arranged rotation- or point-symmetrically with respect to the rotation axis. As a result, in particular a tilting of the two sub-bodies due to the unevenly applied force by means of the axles is avoided. In particular, the first number is greater than or equal to 2, 3, 4, 5 or 6. In particular, the first number is less than or equal to 15, 14, 13, or 12. The first number is particularly preferably equal to 5. In other words, the rotor has 5 axles of this type, the first sub-body has 5 eyelets of this type, and the second sub-body has 5 lugs of this type.

For example, the rotor comprises a further number of second axles, and the second sub-body has a further number of eyelets of this type, within each of which one socket is arranged, and the first sub-body has a further number of lugs. Each socket assigned to the second sub-body and each lug of the first sub-body receives one of the second axles. A comparatively precise positioning of the two sub-bodies, as well as a tolerance compensation and thus a reduced mechanical load thereon, is thus established, the two sub-bodies nevertheless being securely joined together in the axial direction. In particular, one of the second axles is arranged between adjacent axles in the tangential direction. Alternatively or in combination therewith, in particular the distance of the second axles from the rotation axis is constant and suitably equal to the distance of the axles from the rotation axis.

The rotor body suitably has a second number of first sub-bodies and/or a third number of second sub-bodies. The first sub-bodies are arranged alternately with respect to the second sub-bodies in the axial direction. For example, the rotor body includes only one first sub-body but second sub-bodies or only one single second sub-body but two first sub-bodies. The rotor body particularly preferably includes multiple first sub-bodies and multiple second sub-bodies, such as, in particular, two first sub-bodies and three second sub-bodies. In particular, each first sub-body is surrounded by one of the second sub-bodies in the axial direction. Due to the increased number of sub-bodies, the rotor body has a comparatively great extension in the axial direction, the length of the individual sub-bodies being able to be provided with a shorter design in the axial direction. This makes it easier to insert the axle, for which reason an assembly is simplified.

The rotor suitably includes a second rotor body of the same design, which thus has the same design as the rotor body. The second rotor body is joined to the rotor body in the axial direction. Both the rotor body and the second rotor body also each include the magnets, which are magnetized, for example, in the tangential direction. The magnets of the first rotor body and of the second rotor body are offset with respect to each other in the tangential direction, so that they are not in alignment with each other. Due to the offset, a cogging torque of the rotor is reduced, and a torque profile is equalized. For example, the second rotor body is mounted on the shaft, offset by a certain angle with respect to the rotor body. In other words, the second rotor body is rotated by a rotation angle in parallel to the rotor axis with respect to the rotor body. However, the second rotor body is particularly preferably mappable to the rotor body by a rotation of 180° around a straight line, which runs radially, i.e. perpendicularly to the rotation axis. The manufacturing costs are reduced, due to the identical design. For example, the rotor includes additional rotor bodies, in particular three, four or five rotor bodies or more rotor bodies. All rotor bodies are advantageously joined to each other in the axial direction. For example, the magnets of all rotor bodies are offset from each other in the tangential direction. However, at least, the magnets of rotor bodies directly adjacent to each other in the axial direction are preferably offset form each other in the tangential direction.

A cover is preferably arranged on the rotor body on the end face, which completely covers, for example, the rotor body. The cover is suitably in alignment with the rotor body. In other words, the cover is offset in the axial direction with respect to the rotor body and is arranged on the end thereof. In particular, the rotor body is covered by means of the cover. The cover preferably mechanically abuts the rotor body directly, in particular one of the sub-bodies. For example, the rotor body is covered on both sides with a cover in each case, which are arranged on both sides of the rotor body on the end face. If two rotor bodies are present, in particular each of the rotor bodies is covered by one of the covers on the end face pointing away from the other rotor body. The axle is fastened to the cover. A force which is applied to the rotor body is thus applied to the cover by means of the axle. In this way, an application of force over a comparatively wide area takes place by means of the axle, for which reason a deformation of the sub-bodies is essentially avoided, due to a single-point application of force. The axle is suitably connected to two covers, in particular fastened thereto, the rotor body being situated between the covers. The distance of the covers from each other, and thus the contact force of the two sub-bodies against each other, is set by means of the axle. The cover is suitably made from a steel, which increases a robustness.

Alternatively or particularly preferably in combination herewith, the axle is a threaded rod. In this way, an insertion into the socket or lug is made easier, on the one hand, since this may take place by rotating the axle. On the other hand, a comparatively precise setting of the force applied to the rotor body by means of the axle is made possible. In particular, the threaded rod is screwed into the cover, so that the force applied to the rotor body by means of the cover is set by rotating the axle. For example, the cover has a bore with a thread. Alternatively, the cover includes, for example, a nut, which is preferably fastened to other components of the cover, for example welded. In particular, the threaded rod includes a head, so that it is designed in the manner of a screw. Alternatively, nuts are placed on each end of the threaded rod, for example, and in particular a force on the rotor body is set by means of the nuts and their position along the threaded rod, for example via the cover.

The invention furthermore relates to a method for manufacturing a rotor. The shaft is first provided, and the cover, for example, is mounted thereon. In addition, the parts assemblies are provided, which are each, in particular, laminated cores. The two parts assemblies are advantageously baked to each other. The sockets are inserted into the eyelets of the first sub-body, and the first and second sub-bodies are mounted on the shaft. The rest of the cover, for example, is subsequently mounted on the shaft. In addition, the axle is inserted into the lug of the second sub-body and the socket.

Using suitable means, in particular such as the cover and/or possible nuts, the two sub-bodies are pressed against each other by means of the axle.

The electric machine is, for example, a generator or particularly preferably an electric motor, such as a brushless electric motor. In particular, the electric machine is a synchronous machine. The electric machine has, for example, a power output between 30 kW and 150 kW, between 40 kW and 140 kW and, for example, between 60 kW and 100 kW. The nominal rotational speed or maximum rotational speed is suitably between 200 rpm and 8,000 rpm. The torque of the electric machine, which is, for example, a maximum and/or nominal torque, is particularly preferably between 100 newton meters and 20,000 newton meters. The electric machine is, for example, part of a servo press, a ship propulsion or a machine for manufacturing or processing plastic, such as a plastic injection molding machine or an extruder. The electric machine preferably comprises a converter, which includes, in particular, a bridge circuit, such as a B6 circuit. The electric machine is advantageously provided with a three-phase structure. The electric machine includes a rotor and a stator which circumferentially surrounds the rotor. In other words, the electric machine is an internal-rotor motor. The stator advantageously has a number of electromagnets, which are energized, for example, by means of the possible converter. The electromagnets are connected to each other, for example, by a delta or star circuit. The electric machine is preferably provided with a three-phase structure. The electric motor is preferably a torque motor having integrated electronics, and the converter is, in particular, mounted, advantageously on a B-side end shield. A torque motor is understood to be, in particular, a multipole electric direct drive from the group of low-speed machines. The torque motor advantageously has more than 20, 40 or 60 poles.

The stator circumferentially surrounds a rotor, which includes a shaft and a rotor body circumferentially surrounding the shaft. The rotor body comprises a first sub-body and a second sub-body, which are joined together in the axial direction by means of an axle extending in the axial direction and offset radially to the outside with respect to the shaft. The first sub-body has a eyelet, within which a socket receiving the axle is arranged. The second sub-body comprises a lug which receives the axle. The shaft is manufactured, for example, from a steel and is, in particular, a solid shaft. Alternatively hereto, the shaft is a hollow shaft. The electric machine suitably comprises at least one bearing, by means of which the shaft is rotatably supported around an axle. The electric machine preferably comprises two bearings, which are situated in opposite sides of the rotor body in the axial direction. The bearings are, in particular, roller bearings, such as ball or cylinder bearings. The bearings are preferably each connected to an end shield, by means of which a housing of the electric machine is closed on the end face. In particular, the end shields are arranged essentially perpendicularly to the axis of the shaft.

The refinements and advantages discussed in connection with the rotor are to be similarly transferred to the electric machine/the manufacture of the rotor and vice versa.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 3 shows a perspective view of a sub-body of a rotor body;

FIG. 4 shows a sectional representation of a detail of the rotor body;

DETAILED DESCRIPTION

Figure 1:
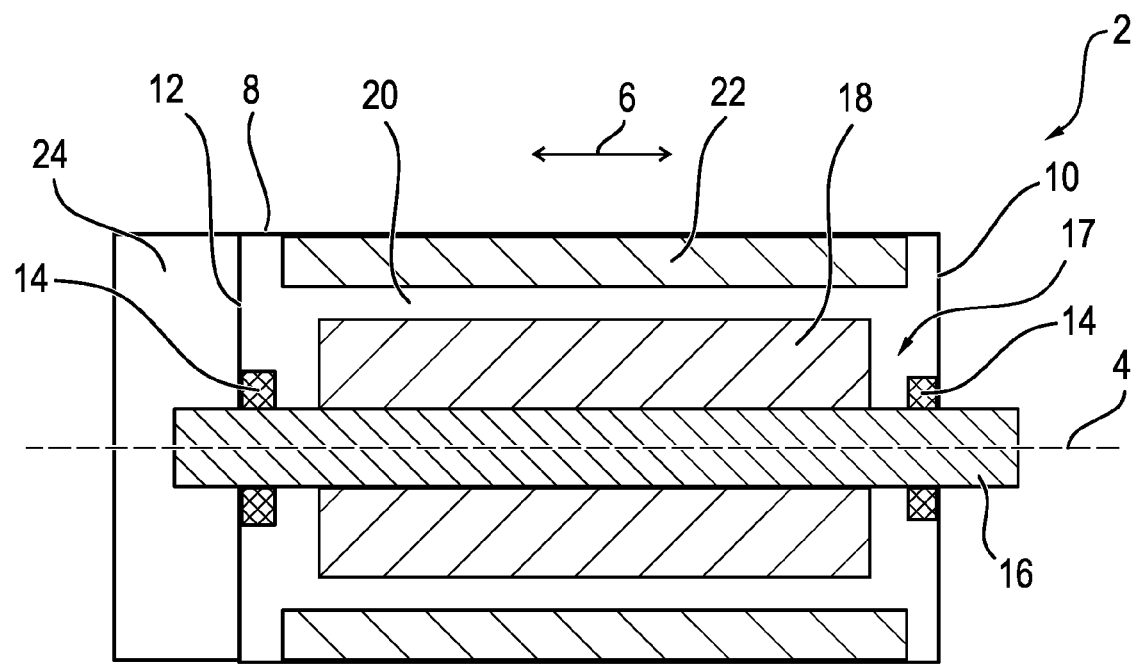
FIG. 1 schematically shows a sectional representation of an electric motor, including a rotor.

FIG. 1 shows a schematically simplified view of an electric machine 2 in the form of a brushless electric motor in a sectional representation along a rotation axis 4, which is in parallel to an axial direction 6. Electric machine 2 includes a hollow cylindrical housing 8, which extends in axial direction 6 and is closed on the end face by means of an A-side end shield 10 and a B-side end shield 12. A ball bearing 14 is fastened to each of the two end shields 10, 12, by means of which a shaft 16 of a rotor 17 is rotatably mounted around rotation axis 4. Shaft 16 is designed as a solid cylinder, which is arranged concentrically to rotation axis 4 and is manufactured from a steel, such as a high-grade steel or another steel. A rotation body 18 is fastened to shaft 16, which circumferentially surrounds shaft 16 and is arranged between the two ball bearings 14. Rotor body 18 directly mechanically abuts shaft 16. Rotor body 18 is circumferentially surrounded by a stator 22, forming an air gap 20 on the outside, which is fastened to the inside of housing 8.

Stator 22 has a number of electromagnets, which are not illustrated in greater detail, in the form of electric coils, which are energized by means of a converter 24 during operation, which is connected on the end face on the side of B-side end shield 12 opposite rotor 17. Stator 22 includes a total of thirty-six coil groups, each having two electric coils. The electromagnets are energized depending on the present position of rotor 17 with respect to stator 22, which is ascertained by means of a rotary transducer, which is not illustrated in greater detail and which is connected to shaft 16 and converter 24 or B-side end shield 12. Another component of a press is connected in the area of shaft 16, which extends through A-side end shield 10, in the assembled state, so that the press is moved by energizing stator 22. A torque of 17,500 newton meters (Nm) is provided by means of electric motor 2. Electric motor 2 is preferably a torque motor having integrated electronics, and converter 24 is, in particular, advantageously mounted on B-side end shield 12.

Figure 2:
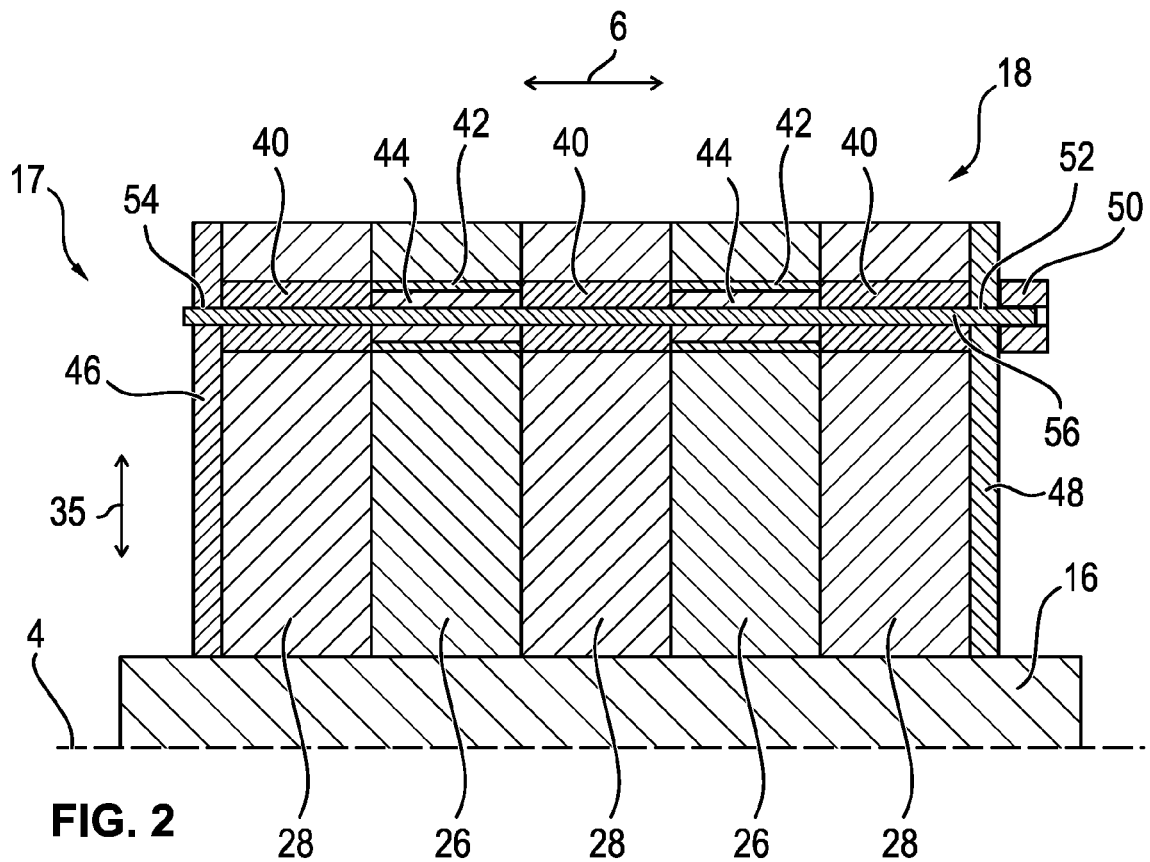
FIG. 2 schematically shows a simplified view of the rotor in a sectional representation.

FIG. 2 shows a schematically simplified detail of rotor 17, including shaft 16 and rotor body 18, in a sectional representation. Rotor body 18 has a second number of first sub-bodies 26, the second number being equal to 2. Rotor body 18 also has a third number of second sub-bodies 28, the second number being equal to 3. First sub-bodies 26 and second sub-bodies 28 are arranged alternately in axial direction 6, so that the two first sub-bodies 26 are each surrounded by one of second sub-bodies 28 in axial direction 6. Sub-bodies 26, 28 are mounted on shaft 16 and essentially form rotor body 18. Each of sub-bodies 26, 28 is a laminated core, including laminations, which are not illustrated here and which are stacked one on top of the other in axial direction 6.

Sub-bodies 26, 28 are structurally identical, and one of these sub-bodies 26, 28 is illustrated in a perspective view in FIG. 3. Each sub-body 26, 28 thus includes a first hollow cylinder 30 extending in axial direction 6 and a second hollow cylinder 32, which circumferentially surrounds the first one and extends axially. First hollow cylinder 30 has two grooves 33 extending in axial direction 6 on the surface facing away from hollow cylinder 32, which are offset from each other by 180° with respect to rotation axis 4. An adjusting spring is inserted within grooves 33 in the assembled state, which is also positioned in another groove of shaft 16. In the assembled state, first hollow cylinder 30 circumferentially surrounds shaft 16 and directly abuts it mechanically.

First hollow cylinder 30 and second hollow cylinder 32 are connected to each other by means of radially running spokes 34. In other words, each of the spokes runs in a radial direction 35, radial direction 35 being defined by means of rotation axis 4. The two hollow cylinders 30, 32 as well as spokes 34 are formed by means of each lamination of particular sub-body 26, 28. Second hollow cylinder 32 is arranged concentrically to first hollow cylinder 30 and rotation axis 4.

An axially extending third hollow cylinder 36 is furthermore arranged between first hollow cylinder 30 and second hollow cylinder 32, which is concentric to rotation axis 4 and is positioned at a distance from both first hollow cylinder 30 and second hollow cylinder 32. Third hollow cylinder 36 is intersected by spokes 34, so that multiple openings 37 are formed between hollow cylinders 30, 32, 36 and the spokes. A weight of rotor body 18 is therefore comparatively low. Either a lug 40 or a eyelet 42 is positioned at each second intersection point of third hollow cylinder 36 with one of the total of twenty spokes 34 in tangential direction 38. Consequently, each sub-body 26, 28 has a total of five lugs 40 and five eyelets 42. Each lug 40 is a hollow cylinder, which extends in axial direction 6. Each eyelet 42 is also a hollow cylinder, which extends in axial direction 6, the outer diameter of eyelets 42 being equal to the outer diameter of lugs 40. The inner diameter of lugs 40 is, however, reduced compared to the inner diameter of eyelets 42. Lugs 40 and eyelets 42 have the same distance from rotation axis 4.

A socket 44 is pressed into each of eyelets 42, so that particular socket 44 is pressed together with particular eyelet 42. Each socket 44 is a hollow cylinder, which is manufactured from plastic, namely polytetrafluoroethylene (PTFE), and which extends in axial direction 6. The outer diameter of structurally identical sockets 44 is slightly larger than the inner diameter of eyelet 42, so that a force fit is established between them during assembly.

In summary, first sub-body 26 has a first number of eyelets 42, within each of which one of sockets 44 is arranged, the first number being equal to 5. Second sub-body 28 also has five eyelets 42 of this type, within each of which one of sockets 44 is arranged. Second sub-body 28 also has the first number of lugs 40, and the first sub-body also has the first number of lugs 40, namely five.

Rotor body 18 is covered by means of a first cover 46 on the side of A-side end shield 10 and by means of a second cover 48 on the side of B-side end shield 12, the covers thus surrounding rotor body 18 in axial direction 6 and being circumferentially in alignment therewith. The two covers 46, 48 are annular disks made from a high-grade steel and are also mounted on shaft 16. The two covers 46, 48 directly mechanically abut shaft 16 and the outermost of second sub-bodies 28 and also directly mechanically abut rotor body 18. Second cover 48 has a total of ten nuts 50, which are situated on the side opposite rotor body 18 and which have the same distance from rotation axis 4 as lugs 40 and eyelets 42.

In addition, holes 52 are introduced into second cover 48, which are in alignment with a central recess of nut 50. Corresponding to holes 52, first cover 46 has a total of ten bores 54, which are arranged rotation-symmetrically with respect to rotation axis 4 and each have a female thread.

Rotor 17 also included five axles 56 in the form of threaded rods. Axles 56 are arranged in axial direction 6, and each of lugs 40 of second sub-body 28 is assigned to one of axles 56 and receives the latter. Each of sockets 44 assigned to first sub-body 26 is also assigned to one of axles 56, and each of sockets 44 receives assigned axle 56. As a result, each of axles 56 extends through three lugs 40 as well as two of sockets 44. The inner diameter of lugs 40 is slightly larger than the outer diameter of the five structurally identical axles 56, so that a clearance sets in between them. A clearance fit is established between each of sockets 44 assigned to axles 56.

For assembly, individual sub-bodies 26, 28 are first suitably positioned and, subsequently thereto, threaded rod 56 is inserted through lugs 40 as well as sockets 44. Axles 56 are arranged between first hollow cylinder 30 and second hollow cylinder 32. Axles 56 are thus also offset to the outside in radial direction 35 with respect to shaft 16. Axles 56 are each screwed into one of nuts 50 of second cover 48 and one of bores 54 of first cover 46, so that a force is applied thereby onto the two covers 46, 48 in axial direction 6 toward each other. As a result, the individual sub-bodies 26, 28 are pressed together and are consequently joined together, a movement of sub-bodies 26, 28 toward each other being prevented due to axles 56.

Rotor 17 furthermore includes five second axles 58, each second axle 58 each being received by lugs 40 of first sub-body 26 and sockets 44 assigned to second sub-body 28. Second axles 58 are also each screwed into one of nuts 50 and one of bores 54, so that the two covers 46, 48 are also pressed together in axial direction 6 by means of the five second axles 58.

A detail of rotor body 18 is illustrated in FIG. 4. It includes chambers 60, which abut second hollow cylinder 32 radially to the outside, which are introduced into first as well as second sub-bodies 26, 28. Second hollow cylinder 32 forms the radially internal base of chambers 60, which each have a rectangular cross-section with rounded corners with respect to rotation axis 4. The main extension of the rectangular cross-section runs in tangential direction 38.

Chambers 60 are mechanically separated from each other and are thus not connected. A total of sixty chambers 60 of this type are present, which are rotation-symmetrically arranged with respect to rotation axis 4. Each of sub-bodies 26, 28 also has a pocket 62, which is radially offset to the outside with respect to each of chambers 60, and which run in radial direction 35 and have a rectangular cross-section. The main extension of the rectangular cross-section runs in radial direction 35. Each of sub-bodies 26, 28 thus has exactly the same number of pockets 62 as chambers 60. Pockets 62 are separated from each other and not mechanically connected.

Each pocket 62 itself extends in axial direction 6 and passes all the way through particular sub-body 26, 28. Each pocket 62 is connected to assigned, radially internal chamber 60 by means of an axially running slot 64, the extension of slot 64 being reduced in tangential direction 38 compared to the extension of pocket 62 by means of two projections 66 oriented in tangential direction 38. The extension of chambers 60 in tangential direction 38 is greater than the extension of assigned pocket 62 in tangential direction 38. In other word, chambers 60 project on both sides in tangential direction 38 with respect to each assigned pocket 62 in tangential direction 38.

An opening 68 abuts each pocket 62 on radial outside 35, via which each pocket 62 is open. Each opening 68 has a trapezoidal cross-section perpendicular to rotation axis 4, so that the outer areas in radial direction 35 are offset from each other. A cuboid magnet 70 arranged in radial direction 35, which is a permanent magnet, is arranged within each pocket 62. Magnets 70 are made from NdFeB. In an alternative design, which is not illustrated, magnets 70 are sintered from a ferrite. Each of sub-bodies 26, 28 includes a total of sixty magnets 70, and electric machine 2 thus includes a total of three hundred magnets 70 of this type, due to the total of five sub-bodies 26, 28.

Figure 5:
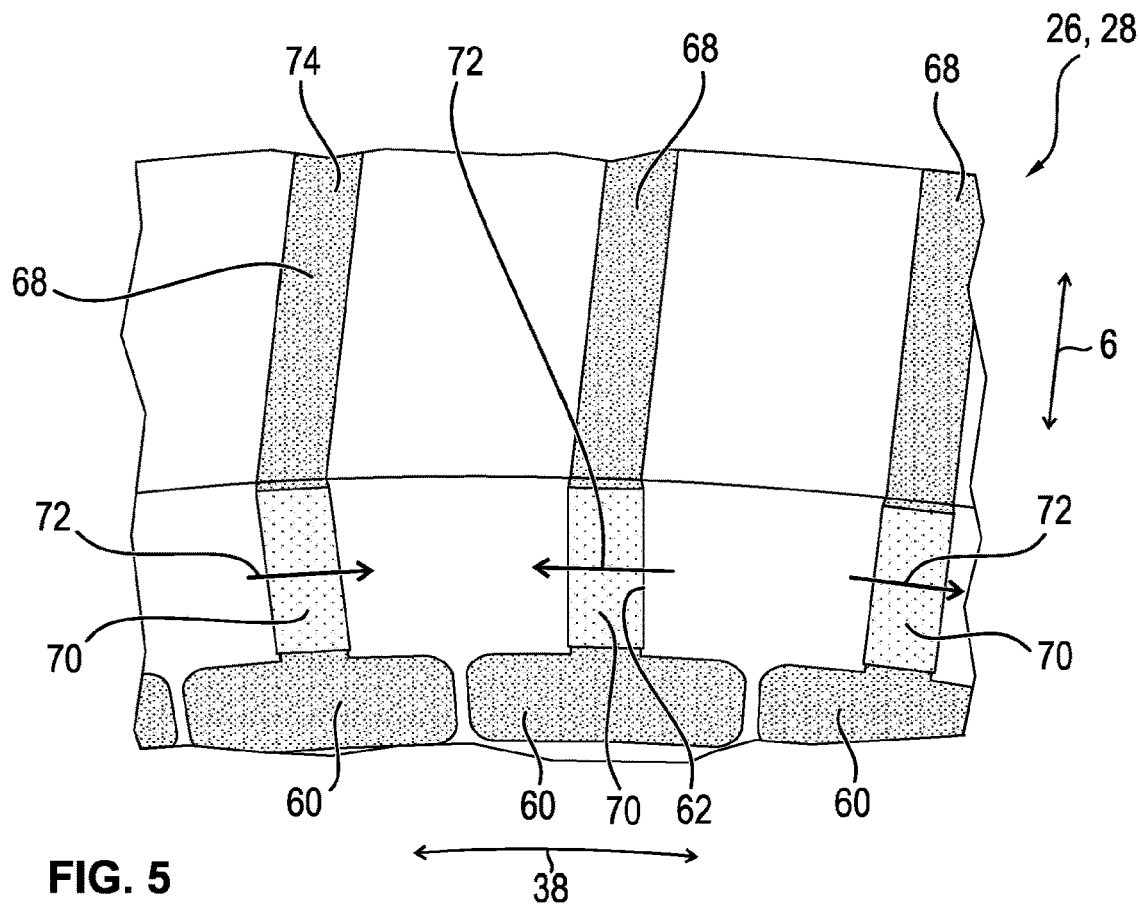
FIG. 5 shows a perspective view of another detail of the rotor body.

A clearance fit is established between each pocket 62 and assigned magnet 70, and each of magnets 70 is provided with a coating made from an epoxy resin. In addition, each of magnets 70 has a magnetization direction 72, which is in parallel to tangential direction 38. In other words, magnets 70 are magnetized in tangential direction 38. In summary, each sub-body 26, 28 includes sixty magnet 70, which are magnetized in tangential direction 38. Magnetization direction 72 of each directly adjacent magnet 70 in tangential direction 38 is opposite, so that the poles of rotor 18 are formed between adjacent magnets 70, as illustrated in FIG. 5. In addition, chambers 60 are situated a distance apart in tangential direction 38 and are therefore not connected.

Each of chambers 60 and each of openings 68 are filled with a paramagnetic or diamagnetic filler 74 in the form of a casting compound. Filler 74 is an epoxy resin, which, after sub-body 26, 28 is mounted on shaft 16, is filled therein and cured. In an other alternative, filler 74 is air.

Due to chambers 60 and filler 74, the field lines provided by means of each magnet 70 are forced to the outside in radial direction 35, so that they emerge into air gap 20 between adjacent openings 68. A spread of the magnetic field lines in radial direction 35 inwardly onto shaft 16, on the other hand, is prevented or at least reduced. Due to filler 74 as well as the webs running between individual chambers 60, a mechanical integrity of individual sub-bodies 26, 28, and thus of rotor body 18, is nevertheless given. Filler 74 has, in particular, an ideal permeability of 1, for which reason the magnetic flux of a pole flows from magnet 70 into stator 22 via air gap 20.

In the assembled state of rotor body 17, sub-bodies 26, 28 are joined together in axial direction 6 in such a way that chambers 60 and pockets 62 of adjacent sub-bodies 26, 28 are in alignment in axial direction 6. Sixty magnets are assigned to each of sub-bodies 26, 28, for which reason rotor body 18 has a total of three hundred magnets 70. In one alternative, only sixty magnets 70 are present, the length of each magnet 70 corresponding to the length of the five sub-bodies 26, 28 in axial direction 6. Each of magnets 70 extends through all sub-bodies 26, 28 of rotor body 18, and is consequently arranged in a total of five of the total of three hundred pockets 62.

Figure 6:
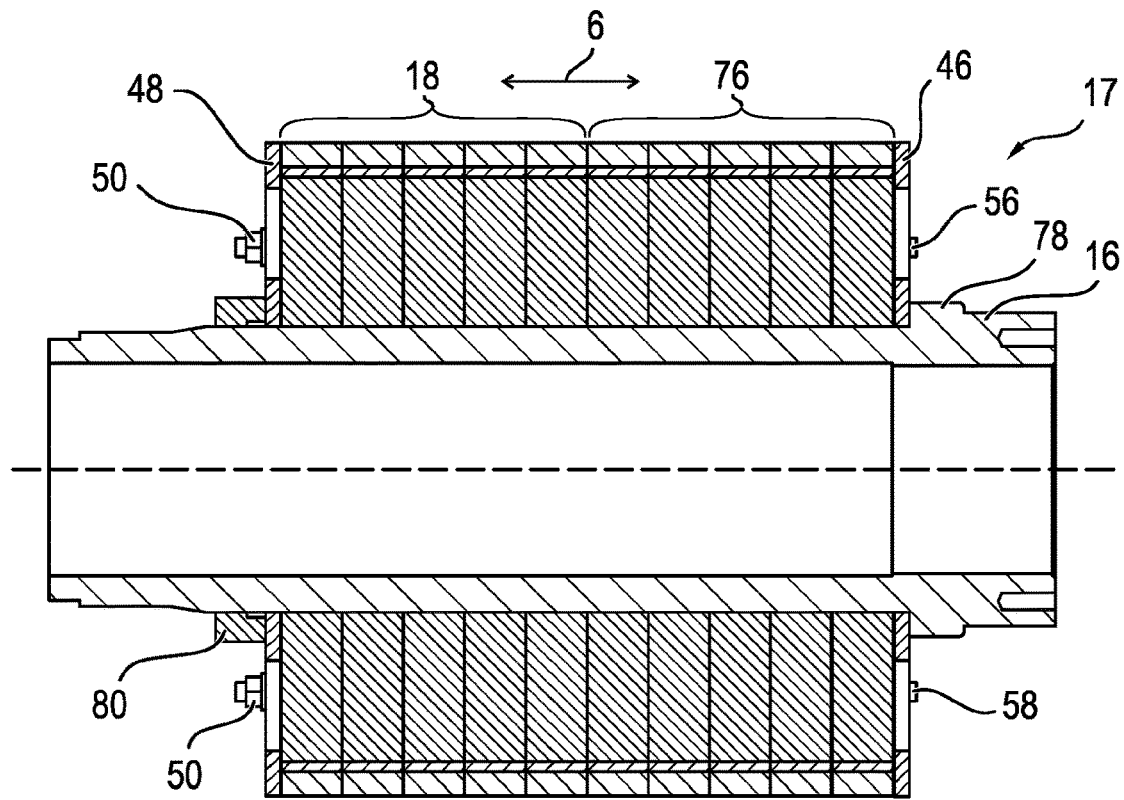
FIGS. 6 and 7 show a schematic and perspective view of another specific embodiment of the rotor, including two rotor bodies.
Figure 7:
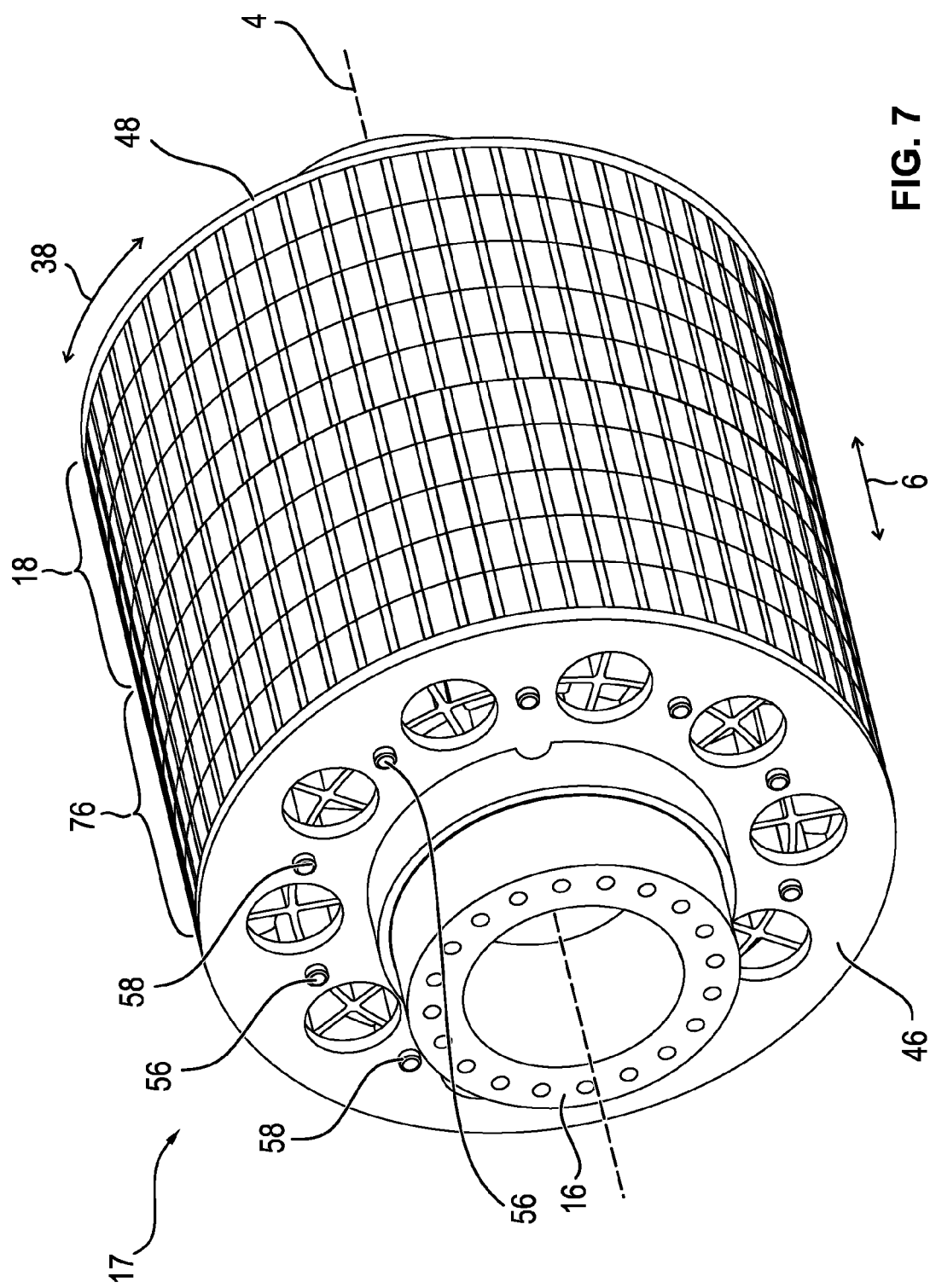

Another specific embodiment of rotor 17 is illustrated in FIGS. 6 and 7. Rotor 17 includes rotor body 18 illustrated in the previous figures and a second rotor body 76, structurally identical thereto, which are arranged adjacent to each other in axial direction 6 between the two covers 46, 48. Shaft 16 is designed as a hollow shaft, and the two rotor bodies 18, 76 are mounted on shaft 16. For assembly, first cover 46 is first placed on shaft 16 until it rests against shoulder 78. Second rotor body 76, rotor body 18 and second cover 48 are subsequently placed on shaft 16. Axles 56, 58 are then inserted through rotor bodies 18, 76 and their particular sub-bodies 26, 28 and fastened by means of nuts 50 and bores 54. As a result, covers 46, 48 and thus rotor bodies 18, 76 and therefore also sub-bodies 26, 28 are pressed against each other in axial direction 6. A collar 80 is subsequently placed on shaft 16 and welded to shaft 16. As a result, a detachment of rotor bodies 18, 76 or covers 46, 48 from shaft 16 is prevented.

In summary, the two rotor bodies 18, 76 are joined together in axial direction 6. Second rotor body 76 is arranged with respect to rotor body 18 in such a way that pockets 62 of rotor body 18 and of second rotor body 76 are offset from each other in tangential direction 38. The offset here is 0.5°. As a result, magnets 70 of the two rotor bodies 18, 76 are not in alignment with each other, for which reason a cogging torque of electric machine 2 is reduced and at least partially eliminated. Second rotor body 76 corresponds to rotor body 18, which is rotated by 180° with respect to a radially running axis. Electric machine 2 includes two springs, which are each arranged within one of grooves 33 of the two rotor bodies 18, 76, which are mirror-symmetrical with respect to rotation axis 4. The cant of rotor 17 is thus achieved, in particular not by the offset of grooves 33 and the springs, but by the offset of the pockets by 0.25° with respect to the center plane of grooves 33. The outer area of magnets 70 is thus rotated by this angle to an inner area of rotor 17. Rearranging the two rotor bodies 17, 76 by 180° around the radially running axis yields an offset (=cant of the rotor) of 0.25°+0.25°=0.5°.

Figure 8:
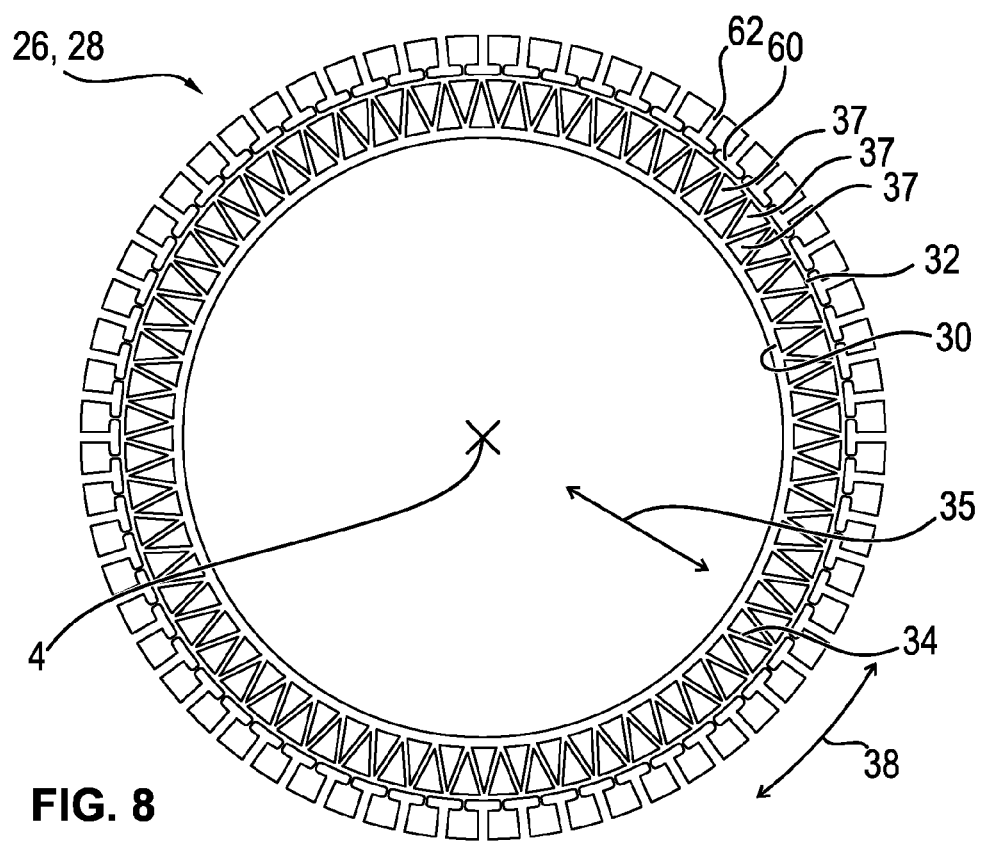
FIGS. 8 to 12 each show a top view of different specific embodiments of the rotor body.

A modification of sub-bodies 26, 28 is illustrated in FIG. 8. Chambers 60 and pockets 62 are unchanged. However, third hollow cylinder 36 is omitted, so that sub-bodies 26, 28 include only first hollow cylinder 30 and second hollow cylinder 32, between which spokes 34 are situated in radial direction 35. Spokes 34 run in radial as well as tangential directions 35, 38, one of the free ends of adjacent spokes 34 each being connected to each other, so that a sun-like arrangement of spokes 34 results. First hollow cylinder 30 is also offset farther to the outside in radial direction 35, compared to the previous specific embodiments. As a result, the shape of openings 37 is modified, compared to the previous specific embodiments.

Figure 9:
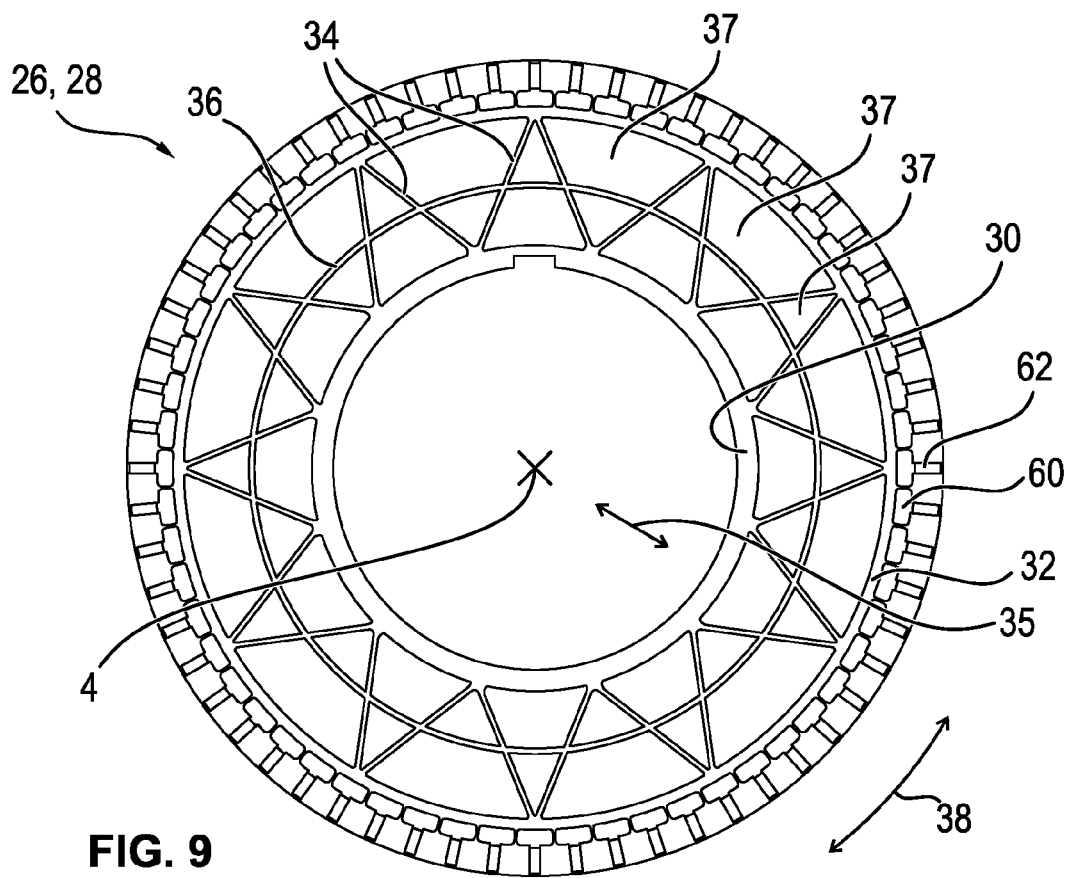

Another specific embodiment of sub-bodies 26, 28 is illustrated in FIG. 9, chambers 60 and pockets 62, in turn, remaining unchanged. Second hollow cylinder 32 again forms the radially internal base of chambers 60. First hollow cylinder 30 is offset to the inside in radial direction 35 and essentially has the same inner diameter as the variant illustrated in FIG. 3. Third hollow cylinder 36 is also present, which is positioned between first hollow cylinder 30 and second hollow cylinder 32 in radial direction 35. The number of spokes 34 is reduced compared to the previous specific embodiment, its progression, in turn, also being in radial direction 35 and tangential direction 38, and each of the free ends of adjacent spokes 34 being connected to each other. Spokes 34 intersect third hollow cylinder 36 in each case.

Figure 10:
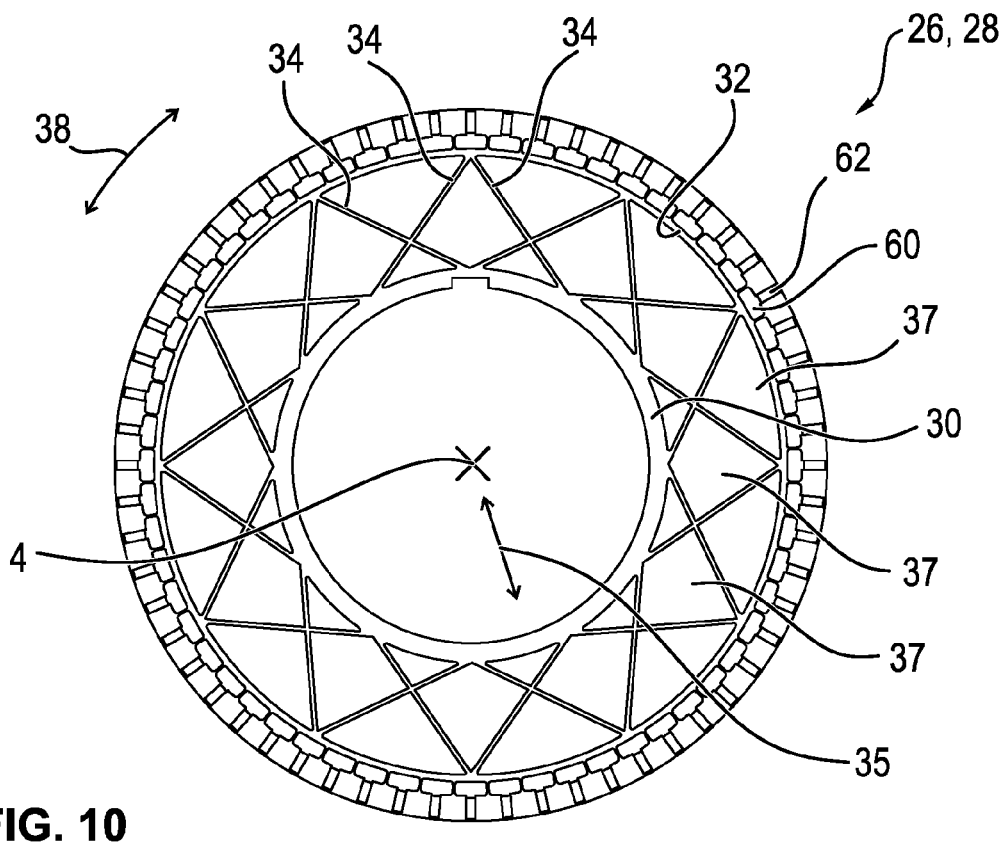

Another specific embodiment of sub-bodies 26, 28 is illustrated in FIG. 10, pockets 62 and chambers 60, in turn, as well as second hollow cylinder 32 remaining unchanged. First hollow cylinder 30 corresponds to the variant illustrated in FIG. 9, third hollow cylinder 36 being omitted in contrast hereto. Spokes 34 are also lengthened and have a more pronounced progression in tangential direction 38, so that adjacent spokes 34 intersect each other between their free ends. The free ends of next spokes 34 but one are connected to each other. Spokes 34 are stabilized with respect to each other, due to the intersection.

Figure 11:
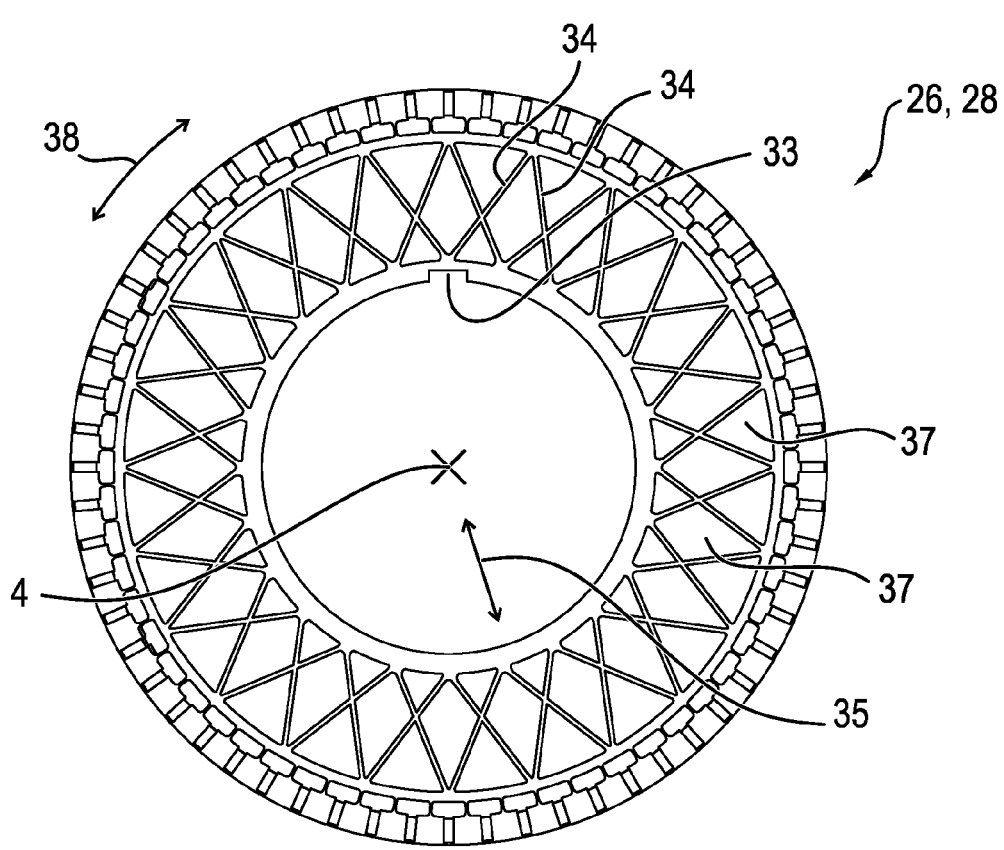

Another specific embodiment of sub-bodies 26, 28 is illustrated in FIG. 11. Compared to the previous specific embodiment, only the number of spokes 34 and their length are changed. The length thus essentially corresponds to the length of spokes 34 illustrated in FIG. 9, the number of spokes 34, however, being doubled compared thereto, and third hollow cylinder 36 being omitted. Two spokes 34 in each case intersect each other, and one of the free ends of each spoke 34 is connected to one of the free ends of the next spoke 34 but one in tangential direction 38. Openings 37 are therefore reduced, compared to the previously illustrated specific embodiment.

Figure 12:
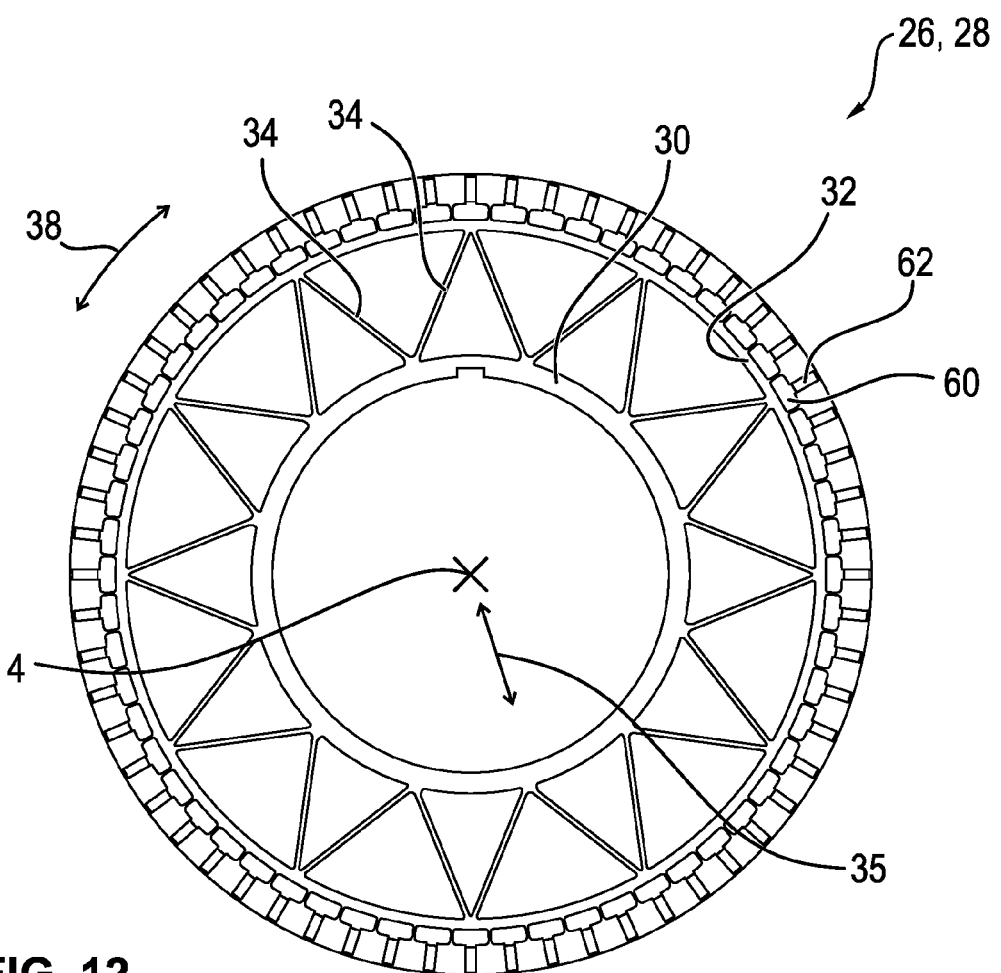

Another specific embodiment of structurally identical sub-bodies 26, 28 is illustrated in FIG. 12. This specific embodiment corresponds to the variant illustrated in FIG. 9, third hollow cylinder 36 being omitted. Spokes 34, first and second hollow cylinders 30, 32 as well as chambers 60 and pockets 62 thus remain unchanged.

Lugs 40 and sockets 44 are not shown in the variants illustrated in FIG. 8 through FIG. 12. However, they are connected to one part of spokes 34 according to the arrangement illustrated in FIG. 3. As a result, these sub-bodies 26, 28 are also joined together in axial direction 6 by means of axles 56 and second axles 58. In other alternative specific embodiments, lugs 40 and/or eyelets 42 are omitted.

Figure 13:
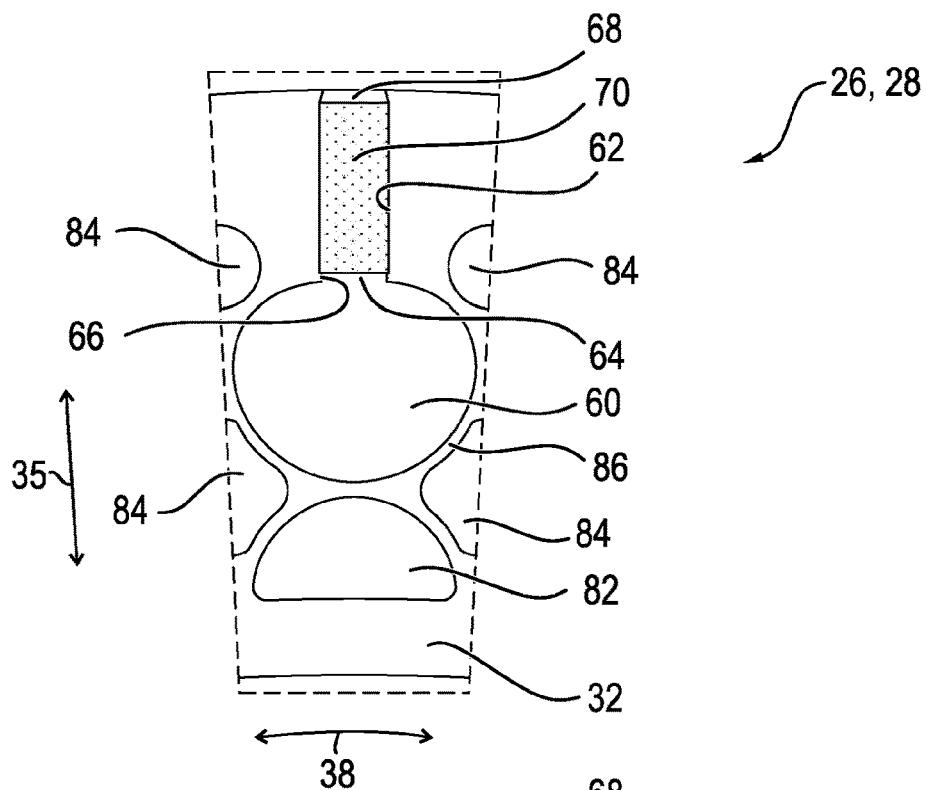
FIGS. 13 and 14 show a detail and a top view of another specific embodiment of the rotor body.
Figure 14:
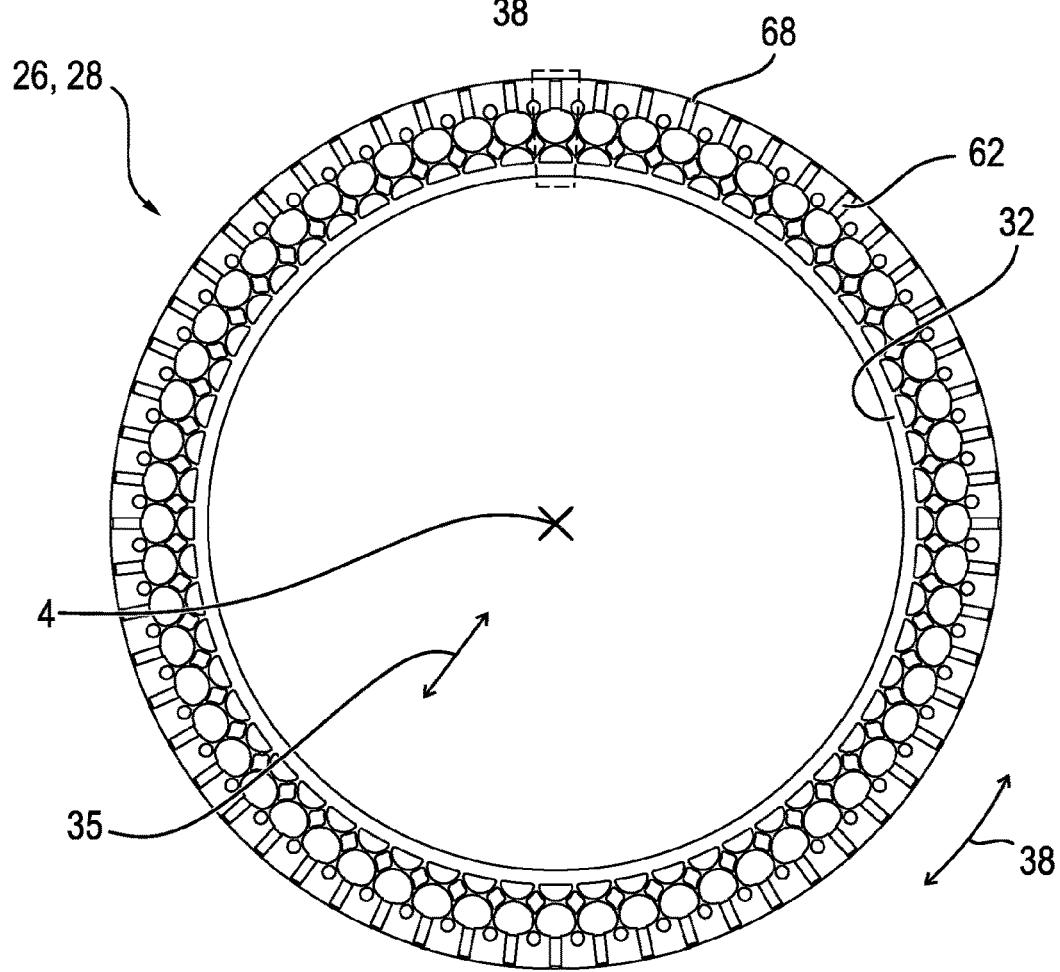

A detail of another specific embodiment of the two sub-bodies 26, 28 according to the illustration in FIG. 4 is shown in FIG. 13, and a larger detail thereof is shown in FIG. 14, FIG. 13 and FIG. 14 showing a detail indicated by means of a dash-dotted line. Pockets 62 as well as magnets 70 and openings 68, by means of which pockets 62 are opened radially to the outside, remain unchanged. Slot 64 and projections 66 also remain unchanged.

Chamber 60 is modified and has a rounded cross-section. None of the edges of the cross-section are straight, while the rounding is varied. Chambers 60 are also offset radially to the outside with respect to second hollow cylinder 32, and a first opening 82 is formed between each of chambers 60 and second hollow cylinder 32 in radial direction 35, whose cross section is essentially provided with a semicircular design and whose straight base is formed by means of second hollow cylinder 32. Sub-bodies 26, 28 furthermore have additional openings 84, which are situated in tangential direction 38 either between adjacent chambers 60 and adjacent first openings 82 or between adjacent chambers 60 and adjacent pockets 62. The cross-section of one part of additional openings 84 is circular and another portion is rhombus-shaped. First opening 82, additional openings 84 and chambers 60 are separated from each other by means of webs 86, and a mechanical integrity of sub-bodies 26, 28 is also present. Due to additional openings 84, a penetration of the magnetic field lines provided by means of magnets 70 is further reduced radially to the inside. For example, spokes 34 of first hollow cylinder 30 and possible f third hollow cylinder 36 abut each other on the radial inside of second hollow cylinder 32 according to the variants shown in FIGS. 3 through 12. The magnetic flux of the opposite pole is minimized due to hollow cylinder 32 and webs 86. The mechanical performance is influenced, depending on the mechanical design of webs 86. The mechanic strength is increased and webs 86 stabilized by means of filler 74.

Figure 15:
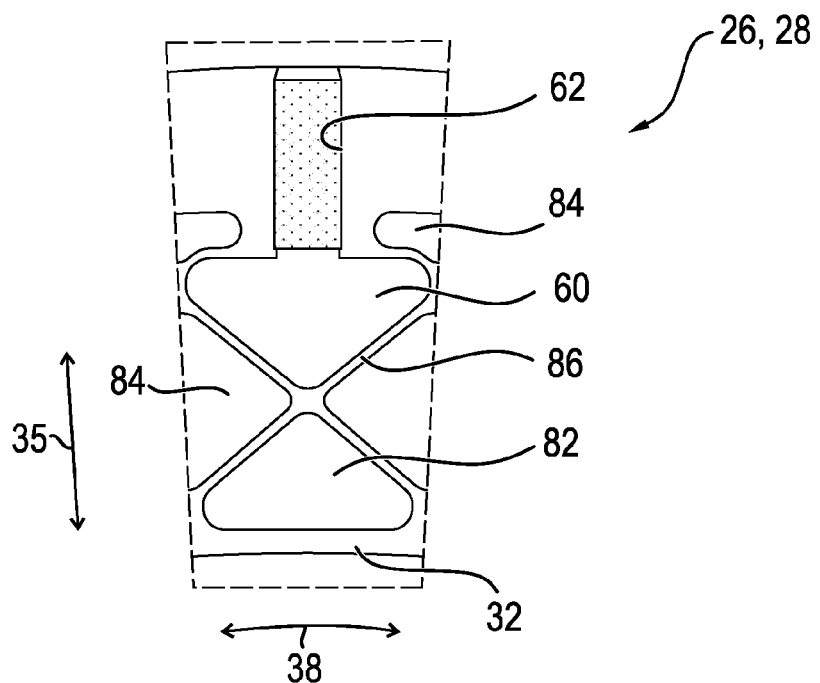
FIGS. 15 and 16 show a detail and a top view of another specific embodiment of the rotor body.
Figure 16:
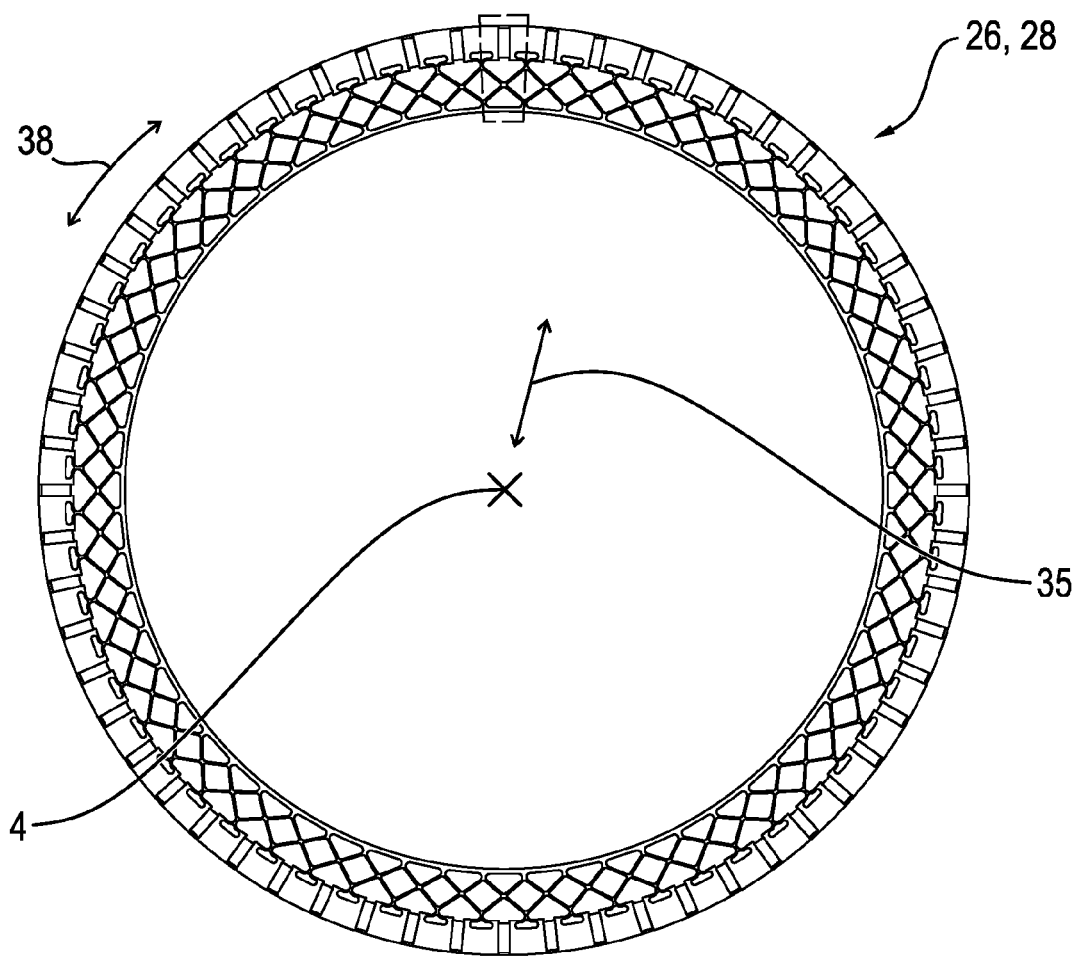

Another embodiment of sub-bodies 26, 28 according to FIGS. 13, 14 is illustrated in FIG. 15 and FIG. 16, first hollow cylinder 30, spokes 34 and possibly third hollow cylinder 36 again not being shown here. Compared to the preceding specific embodiment, chambers 60, first openings 82 and additional openings 84 as well as webs 86 and second hollow cylinder 32 are modified, only the thickness of second hollow cylinder 32 being reduced in radial direction 35. The cross-section of chambers 60 is triangular with rounded corners, the triangle being an equilateral triangle whose tip points radially to the inside. The cross section of first opening 82 is also triangular and corresponds to the cross section of the assigned chamber 60, which is, however, rotated by 180° in such a way that the two tips point toward each other. Webs 86 essentially run in a straight line and intersect each other at an angle of 100° in both radial and tangential directions 35, 38. As a result, part of additional openings 84 is rhombus-shaped. Additional openings 84 arranged between pockets 62 essentially have a rectangular cross-section. For example, spokes 34, first hollow cylinder 30 and possibly third hollow cylinder 36 abut each other on the radial inside of second hollow cylinder 32 according to the variants shown in FIGS. 3 through 12.

Figure 17:
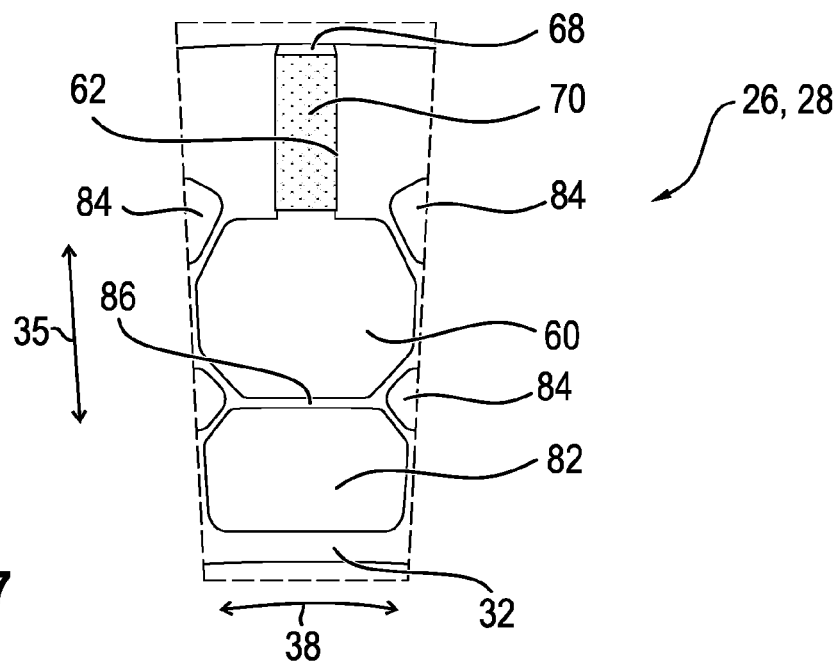
FIGS. 17 and 18 show a detail and a top view of a final specific embodiment of the rotor body.
Figure 18:
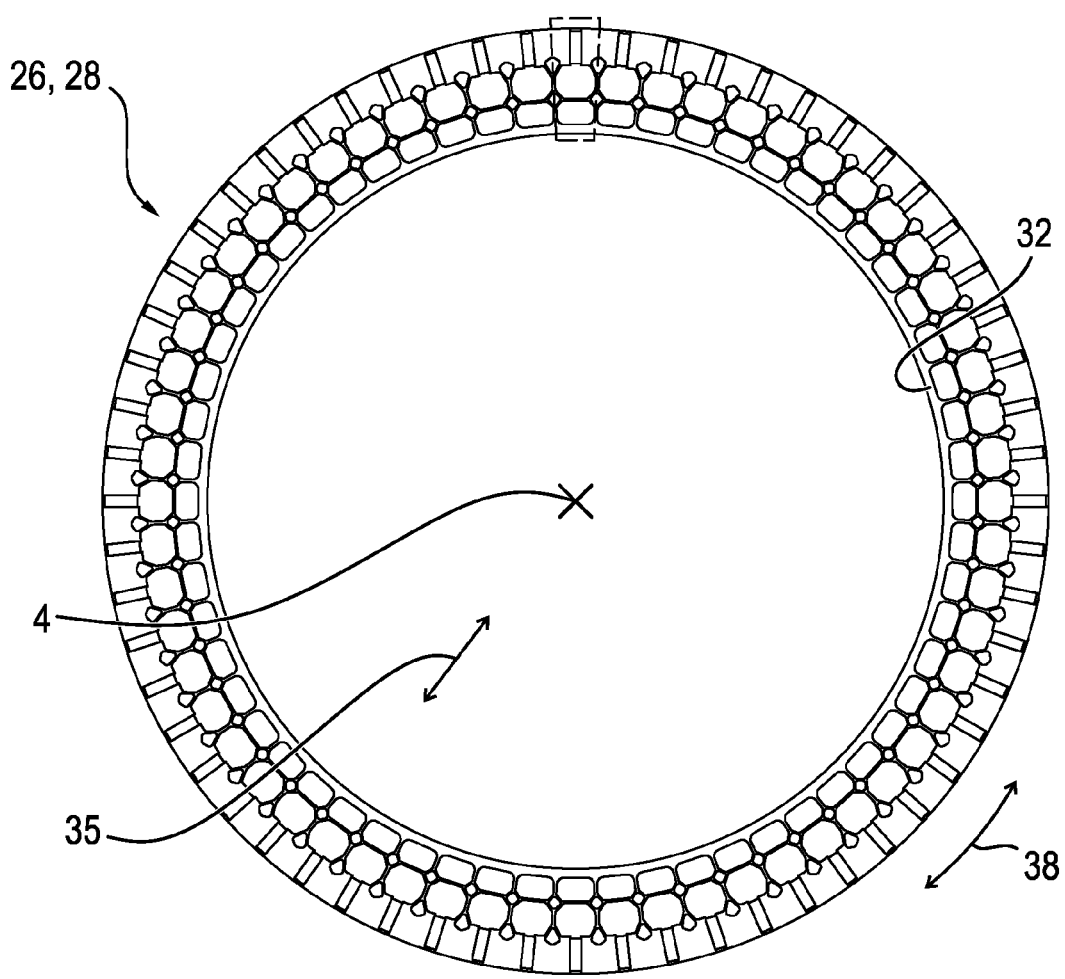

An embodiment of sub-bodies 26, 28 is illustrated in FIG. 17 and FIG. 18. In this specific embodiment, chambers 60 have a honeycomb-shaped cross-section. In other words, the cross-section is a regular octagon in each case. The cross-section of first opening 82, which again is situated between second hollow cylinder 32 and assigned chamber 60 in each case, is essentially cuboid or hexagonal. The cross-section of additional openings 84 is provided with a rhombus-shaped or circular design. As a result, webs 86 run in a straight line, the number of webs 86 being increased, compared to the preceding specific embodiment. Due to the honeycomb-shaped design of chambers 60 with the octagonal cross-section, a comparatively high robustness is given. For example, spokes 34, first hollow cylinder 30 and possibly third hollow cylinder 36 abut each other on the radial inside of second hollow cylinder 32 according to the variants shown in FIGS. 3 through 12.

In the embodiments shown in FIGS. 13 through 18, chambers 60, first openings 82 and additional openings 84 are preferably filled with filler 74, which is epoxy resin. As a result, the mechanical integrity of sub-bodies 26, 28 is further increased.

In summary, the magnetic resistance is increased, due to the design of sub-bodies 26, 28, which results in an increased torque. However, a comparatively high strength is given, due to the design of chambers 60 as well as webs 86 and spokes 34. Due to the different geometries, a comparatively high mechanical rigidity is given, and the magnetic resistance in the braced areas, in particular webs 86 and spokes 34, is increased, for which reason an increased torque is achieved. Electric machine 2 designed as an internal-rotor motor also has a so-called spoke design, due to the radial arrangement of magnets 70.

The invention is not limited to the exemplary embodiments described above. Instead, other variants of the invention may be derived herefrom by those skilled in the art without going beyond the subject matter of the invention. Moreover, in particular, all individual features described in connection with the individual exemplary embodiments may also be otherwise combined with each other without going beyond the subject matter of the invention.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A rotor of an electric machine, the rotor comprising:
a shaft; and
a first rotor body that circumferentially surrounds the shaft and includes a first sub-body and a second sub-body, which are joined together in an axial direction by a first axle that extends in the axial direction and is offset radially to the outside with respect to the shaft, the first sub-body including an eyelet within which a socket receiving the first axle is arranged, and the second sub-body having a lug which receives the first axle.

2. The rotor according to claim 1, wherein the socket is pressed with the eyelet and/or the socket is manufactured from a plastic.

3. The rotor according to claim 1, wherein an outer diameter of the eyelet is equal to an outer diameter of the lug.

4. The rotor according to claim 1, wherein the first and second sub-bodies are each a laminated core.

5. The rotor according to claim 1, wherein the first sub-body and the second sub-body each include an axially extending first hollow cylinder and an axially extending second hollow cylinder which circumferentially surrounds the first hollow cylinder, and the first and second hollow cylinders are connected to each other by radially running spokes, the first axle being arranged between the first hollow cylinder and the second hollow cylinder.

6. The rotor according to claim 1, further comprising a second axle, the second sub-body including an eyelet, within which a socket receiving the second axle is arranged, and the first sub-body having a lug which receives the second axle.

7. The rotor according to claim 6, wherein the first and second sub-bodies are structurally identical.

8. The rotor according to claim 6, wherein when the first sub-body and the second sub-body are mounted on the shaft, the eyelet and the socket of the second sub-body are aligned with the lug of the first sub-body, such that the second axle extends through both the socket of the second sub-body and the lug of the first sub-body.

9. The rotor according to claim 1, wherein the first sub-body has a first number of the eyelet, within each of which the socket is arranged, wherein the second sub-body has the first number of the lug, and wherein the first sub-body and the second sub-body are joined together by the first number of the first axle, and wherein each socket and each lug receive a respective one of the first axle.

10. The rotor according to claim 9, further comprising a second number of the first sub-body and/or a third number of the second sub-body, which are alternately arranged in the axial direction.

11. The rotor according to claim 1, further comprising a second rotor body that is structurally identical to the first rotor body, wherein the second rotor body is joined to the first rotor body in the axial direction, and wherein magnets of the first rotor body and the second rotor body are offset with respect to each other in the tangential direction.

12. The rotor according to claim 1, wherein a cover is arranged on the first rotor body to which the first axle is fastened, and/or wherein the first axle is a threaded rod.

13. An electric machine, comprising a rotor according to claim 1, and a stator which circumferentially surrounds the rotor.

14. The rotor according to claim 1, wherein when the first sub-body and the second sub-body are mounted on the shaft, the eyelet and the socket of the first sub-body are aligned with the lug of the second sub-body, such that the first axle extends through both the socket of the first sub-body and the lug of the second sub-body.

* * * * *